United States Patent [19]

Cremosnik

[11] 4,024,466

[45] May 17, 1977

[54] LASER CONTAINING A LASER RESONATOR

[75] Inventor: Gregor Cremosnik, Regensdorf, Switzerland

[73] Assignee: Werkzeugmaschinenfabrik Oerlikon-Buhrle AG, Zurich, Switzerland

[22] Filed: Aug. 18, 1975

[21] Appl. No.: 605,645

[30] Foreign Application Priority Data

Aug. 28, 1974 Switzerland .................. 11718/74

[52] U.S. Cl. .................. 331/94.5 D; 331/94.5T
[51] Int. Cl.² .................................. H01S 3/08
[58] Field of Search ............................ 331/94.5

[56] References Cited

UNITED STATES PATENTS

| | | | |
|---|---|---|---|
| 3,229,223 | 1/1966 | Miller | 331/94.5 Q |
| 3,564,450 | 2/1971 | Immarco et al. | 331/94.5 Q |
| 3,757,249 | 9/1973 | Carman, Jr. et al. | 331/94.5 Q |

*Primary Examiner*—William L. Sikes
*Attorney, Agent, or Firm*—Werner W. Kleeman

[57] ABSTRACT

A laser containing a laser resonator possessing a laser rod and an electro-optical modulation device between two mirrors. The modulation device comprises a polarization element and a component embodying an electro-optical crystal at the opposite faces of which there are arranged electrodes. Both faces of the crystal and a polarization prism of the polarization element possess a degree of planeness less than one-tenth of the wavelength of the laser light and with respect to one another a plane-parallelism of less than five arc seconds for increasing the stored energy in the laser resonator and the power output.

4 Claims, 3 Drawing Figures

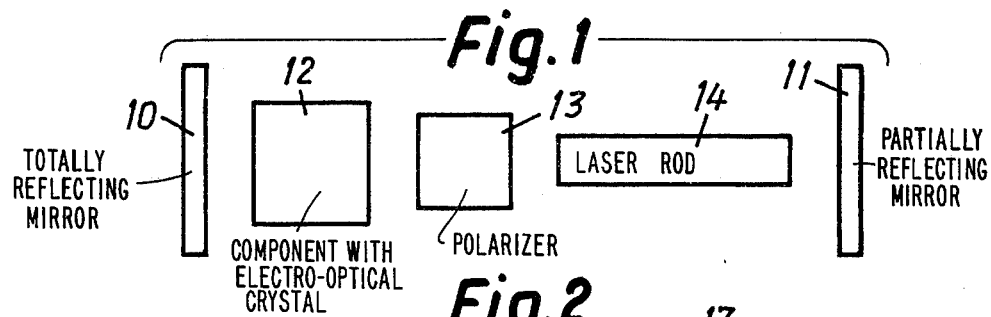
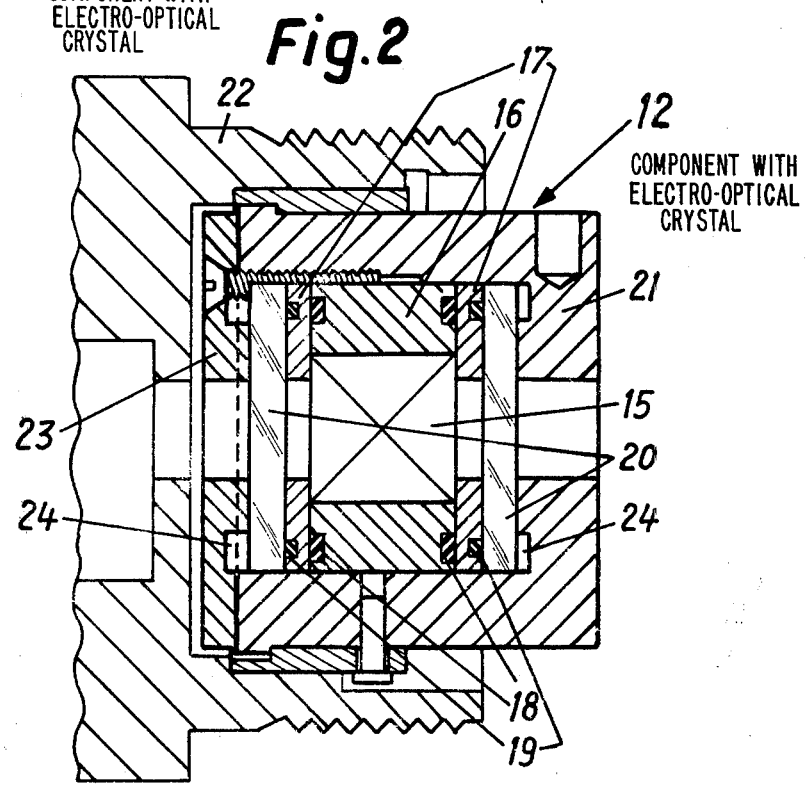
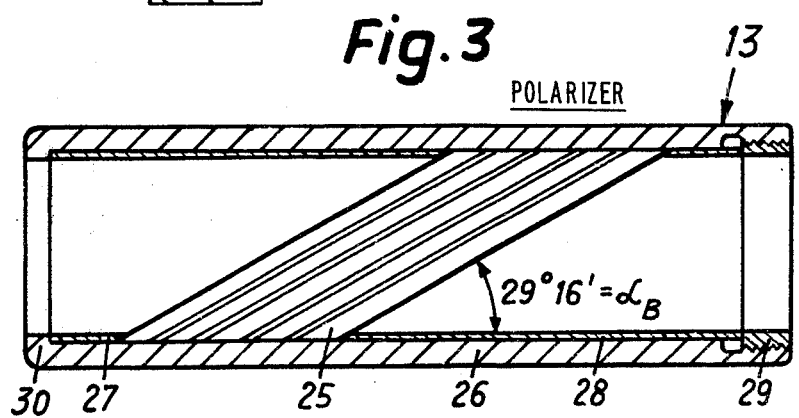

LASER CONTAINING A LASER RESONATOR

BACKGROUND OF THE INVENTION

The present invention relates to a new and improved construction of laser or laser arrangement containing a laser resonator possessing a laser rod and an electro-optical modulation device between two mirrors, the modulation device comprising a polarization element and a component containing an electro-optical crystal at the opposite faces or sides of which there are arranged electrodes.

Devices of this type are already known to the art wherein the optical surfaces thereof are provided with anti-reflection layers in order to maintain the reflection losses as small as possible. However, the anti-refection layers are associated with the drawback that they become damaged when exposed to the high load of the laser beam or radiation in the laser resonator, and they only can be applied with difficulty to hygroscopic electro optical crystals, especially KDP and $KD_2P$ (potassium-dideuterium phosphate), and thus, possess only a short service life or longevity.

SUMMARY OF THE INVENTION

Hence, it is a primary object of the present invention to provide an improved laser containing a laser resonator which is not associated with the aforementioned drawbacks and limitations of the prior art proposals.

Another and more specific object of the present invention aims at avoiding the aforementioned drawbacks and providing an apparatus wherein the reflection losses can be maintained as small as possible without the use of anti-reflection layers, coatings or the like.

Now in order to implement these and still further objects of the invention, which will become more readily apparent as the description proceeds, the apparatus of this development is manifested by the features that both oppositely situated faces of the crystal and the polarization prism possess a degree of planeness which is less than one-tenth of the wavelength of the laser light and with respect to one another possess a plane-parallelism of less than five arc seconds for increasing the stored energy in the laser resonator and the power output. Additionally, the aforementioned elements of the modulation device should be exactly aligned with respect to the mirrors. The degree of reflection or reflection factor of the laser output mirror is adjusted such that together with the partial reflection at the optical surfaces of the modulation device there is attained an optimum laser output beam or radiation.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 schematically illustrates the construction of a laser resonator designed according to the teachings of the present invention;

FIG. 2 is an enlarged cross-sectional view through a component equipped with an electro-optical crystal of the modulation device; and FIG. 3 is a sectional view through a Brewster-polarizer of the modulation device.

DETAILED DESCRIPTION OF THE PREFERRED EMBODIMENTS

Describing now the drawing, according to the exemplary arrangement of FIG. 1 the laser resonator possesses a first completely reflecting mirror 10 and a second partially reflecting mirror 11. As concerns the completely reflecting mirror 10 the reflection factor or coefficient amounts to almost $R = 1$ and as regards the partially reflecting mirror 11 the reflection factor or coefficient R varies between 0.4 to 0.9. Arranged between both of these mirrors 10 and 11 is a modulation device comprising a. a component 12 containing an electro-optical crystal 15, and b. a Brewster-polarizer 13, polarization prism or dielectric polarizer, as well as a laser rod 14, which components will be described more fully hereinafter.

The Component With The Electro-Optical Crystal

The electro-optical modulation device is also referred to as a pockel cell and behaves similar to a Kerr cell. The component 12 of the modulation device possesses a crystal 15, there is preferably used a $KD_2P$ (potassium-didenterium-phosphate) crystal possessing a cube shape or form having an edge length of 0.5 to 1 inch. With a beam diameter up to 8 mm. there is sufficient an edge length of 0.5 inch, for a beam diameter of 13 mm. there is required a cube of 0.75 inch edge length, and for a beam diameter up to 20 mm. there is required a crystal cube of 1 inch edge length.

The $KD_2P$ - crystal 15 is markedly hygroscopic, it is therefore necessary to protect it against moisture by particular measures, as will be explained by way of example hereinafter.

Furthermore, it is important that the surfaces where the laser beam enters and exits are exactly machined or otherwise worked. The deviation from planeness only can amount to $\lambda/10$ i.e. approximately $10^{-5}$ cm. and the deviation from the plane-parallelism should not be greater than 5 arc seconds. Additionally, these surfaces should be parallel to the surfaces of the mirrors 10 and 11, i.e. also here the deviation should not be greater than 5 arc seconds.

The crystal 15 is located within an inner housing 16 which is preferably fabricated from "TEFLON." The length of this housing 16 is somewhat smaller than the length of the crystal 15, so that there is obtained a faultless contact of two gold-plated electrodes 17, for instance formed of brass, a gold layer being vapor deposited upon the corresponding crystal surfaces.

Sealing rings 18 or the like are arranged in not particularly referenced grooves of the inner housing 16 and against which sealingly bear electrodes 17. Additional sealing rings 19 are arranged in also not particularly referenced grooves of the electrodes 17 at which sealingly bear quartz glass windows 20. In order that there is insured for a faultless contact between the electrodes 17 and the gold layer at the crystal 15 the grooves at the inner housing 16 are somewhat wider than the grooves 19 at the electrodes 17.

The brass electrodes 17 are finely polished at both faces or sides prior to there being applied the thin gold layer.

By means of the sealing rings 18 and 19 there is obtained a seal which faultlessly protects the crystal 15 against moisture.

The observations which have been made concerning the machining of the crystal are equally applicable for the machining of the quartz glass windows 20. The deviation from planeness only should amount to λ/10 i.e. approximately $10^{-5}$ cm, and the deviation from the plane-parallelism should not be greater than 5 arc seconds. Additionally, these surfaces of the quartz glass windows 20 should be parallel to the surfaces of the mirrors 10 and 11, i.e. the deviation also in this case should not be greater than 5 arc seconds. In order to avoid this exact adjustment of the quartz glass windows 20 there could be otherwise vapor deposited at both faces anti-reflection layers. In this case the deviation of such surfaces from the plane-parallelism in the optical resonator can amount to a number of degrees. However, it must be remembered that the object of the invention is to avoid the use of such anti-reflection layers or coatings.

The crystal 15 with the inner housing 16, the electrodes 17 and the windows 20 are located in an outer or external housing 21 which is likewise fabricated from TEFLON, so that there is insured for a reliable insulation with respect to a metallic housing 22. This insulation is necessary since potentials amounting up to 6 kilovolts are applied to the electrodes and the switching times are below 10 nanoseconds. The outer housing 21 is closed by a cover 23. In order that the quartz glass windows 20 do not bear completely at the housing 21 and at the cover 23, respectively, there are provided grooves 24 so that there is achieved a certain resilient or shock absorbing action. In these grooves 24 there can be likewise inserted sealing rings.

The Polarizer

As the polarizer 13 there can be used either a Brewster-polarizer according to the showing of FIG. 3 or another suitable polarizer, for instance a Glan-polarization prism or a dielectric polarizer. The efficiency of the Bewster-polarizer amounts to about 60%.

The Brewster-polarizer possesses five small plates 25 formed of optical glass. These plates 25 are inclined through the so-called Brewster-angle $\alpha_\beta = 29°16'$. The polarization factor or coefficient is dependent upon the number of plates as well as the refractive index of the optical glass. Five plates are sufficient since the laser beam emanating from the laser rod 14 is already partially polarized, since a larger number of plates does not provide any appreciable advantage, and since each plate 25 causes a dampening of the laser resonator and therefore a compromise must be accepted.

The small glass plates 25 must be machined with the same accuracy as the quartz glass windows 20. Between the plates 25 there are arranged exactly fabricated aluminium foils (not referenced) which insure for an exact spacing between the plates and an exact parallelism of such plates.

The plates 25 are located in a tube or tubular member 26 and are held between two sleeves 27 and 28. The tube 26 possesses at its left end a flange 30 at which there is supported the sleeve 27. At the sleeve 27 there bear the five small plates 25 with the intermediately arranged aluminium foils. By means of the sleeve 28 the plates 25 are pressed against one another. A nut member 29 or the like, which is threaded into the right end of the tube 26, presses the sleeve 28 against the small plates 25.

Having now had the benefit of the foregoing description of the apparatus the mode of operation of the described laser resonator is as follows: The laser rod 14 together with a not particularly illustrated light source forms an active medium which transmits the light, due to excitation of atoms, initially in an irregular manner in all spatial directions. Part of this light falls perpendicularly upon one of both mirrors 10 and 11 and such mirror 10 or 11 reflects the light back into the laser rod 14. This reflected light is amplified in the laser rod 14 and reflected by the other mirror 11 or 10, as the case may be, again travels through the laser rod 14 and is again amplified and so forth. Within a very short period of time there is formed between both of the mirrors 10, 11 from the spontaneous emission a very intensive beam or radiation density. Since the one mirror is only partially reflective and additionally partially transparent a part of the light can escape out of the resonator.

With high light intensity the laser resonator no longer functions as a linear amplifier: the amplification decreases. There is finally realized an equilibrium condition between the losses due to scattering, reflection and bending of light and the amplification. During the stationary operation the light is amplified to just such an extent as it is weakened by the aforementioned losses.

One of the objectives of the present invention is to maintain the losses as small as possible. This object is realized in that in addition to the aforementioned resonator, which consists of both mirrors 10, 11 and the laser rod 14, there are formed further resonators, i.e. partial resonators. One such partial resonator consists of two partially reflecting surfaces. Partially reflecting surfaces are present at the crystal 15, at the polarization prism 13 and at the quartz glass windows 20. In the event that these surfaces are aligned with extremely great parallelism to the surfaces of the mirrors 10, 11 and parallel to one another, and in the event that the degree of the planeness of such surfaces is very accurate, then it is possible by means of the partial resonators to compensate the additional losses due to scattering and reflection, which are produced by the installation of the modulation device in the laser resonator, and to improve the efficiency of the entire laser arrangement.

During the determination of the reflection factor or coefficient of reflection for the partially reflecting mirror there must be taken into account the partial resonators.

While there is shown and described present preferred embodiments of the invention, it is to be distinctly understood that the invention is not limited thereto, but may be otherwise variously embodied and practised within the scope of the following claims. Accordingly, What is claimed is:

1. A laser arrangement containing a laser resonator comprising:
   a. two mirrors;
   b. a laser rod; and
   c. an electro-optical modulation device between said two mirrors;
   d. said modulation device comprising:
      i. a polarization element and
      ii. a component possessing an electro-optical crystal between one of said two mirrors and said polarization element;
   e. said electro-optical crystal having oppositely situated partially reflecting surfaces at which there are arranged electrodes; said polarization element possessing oppositely situated partially reflecting surfaces
f. both of the oppositely situated partially reflecting surfaces of the electro-optical crystal and of the polarization element possessing:
  i. a degree of planeness less than one-tenth of the wavelength of the laser light and
  ii. a plane parallelism of less than five arc seconds with respect to each other and to the resonator mirrors for increasing the stored energy in the laser resonator and the power output.

2. The laser arrangement as defined in claim 1, wherein the polarization element comprises a polarization prism.

3. The laser arrangement as defined in claim 2, wherein each mirror has a reflecting surface, both the oppositely situated faces of the crystal and the polarization prism possess a plane-paralelism of less than 5 arc seconds with respect to the reflecting surfaces of the mirrors of the laser resonator.

4. The laser arrangement as defined in claim 1, wherein all said faces possess a plane parallelism with respect to one another of less than 5 arc seconds.

* * * * *